Figure 1:
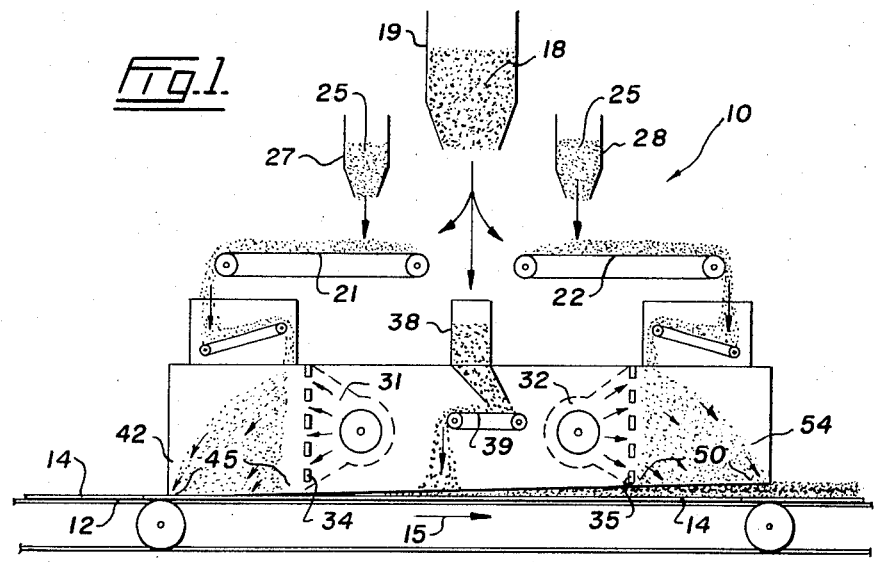

United States Patent [19]  
Cartlidge et al.

[11] 3,873,662  
[45] Mar. 25, 1975

[54] METHOD OF PRODUCING FIRE RETARDANT PARTICLEBOARD
[75] Inventors: Dennis M. Cartlidge, North Delta; Keith Sharpe, Langley, both of Canada
[73] Assignee: MacMillan Bloedel Limited, Vancouver, British Columbia, Canada
[22] Filed: Nov. 6, 1972
[21] Appl. No.: 304,199

[30] Foreign Application Priority Data  
Nov. 1, 1972  Canada ................................ 155747

[52] U.S. Cl. ............... 264/113, 156/62.2, 161/403, 264/121, 264/122, 264/139, 264/162
[51] Int. Cl. ............................................... B29j 5/00
[58] Field of Search ........ 156/62.2, 62.4, 62.8, 153; 264/113, 121, 122, 139, 162; 161/403, 261, 262, 170; 252/8.1

[56] References Cited  
UNITED STATES PATENTS  
2,624,079  1/1953  Duvall ................................ 264/113

| | | |
|---|---|---|
| 3,098,781 | 7/1963 | Greten ................................ 264/113 |
| 3,312,999 | 4/1967 | Greten et al. ........................ 425/81 |
| 3,383,274 | 5/1968 | Craig ............................. 161/403 X |
| 3,438,847 | 4/1969 | Chase ............................ 161/403 X |
| 3,535,199 | 10/1970 | Kuhr ............................... 161/403 X |
| 3,649,397 | 3/1972 | Peters ............................... 156/62.2 |

*Primary Examiner*—Daniel J. Fritsch  
*Attorney, Agent, or Firm*—Fetherstonhaugh & Company

[57] ABSTRACT

A process of producing fire retardant particleboard comprising forming courses of particleboard furnish and dry fire retardant chemical immediately under courses of fine furnish particles which form outer courses of the particleboard, consolidating the assembled particles under heat and pressure, and sanding off particles of the outer courses to expose the inner courses as faces of the board.

7 Claims, 3 Drawing Figures

PATENTED MAR 25 1975                                         3,873,662

METHOD OF PRODUCING FIRE RETARDANT PARTICLEBOARD

This invention relates to methods of producing fire retardant particleboard with a minimum of fire retardant material.

Some effort has been made in the past to produce fire retardant particleboards by mixing fire retardant chemicals with the particleboard furnish. This made it more difficult to handle the furnish, resulted in uneven distribution of the retardant throughout the furnish, the use of more retardant chemicals than necessary since they do not serve any useful purpose in the core of the board, and a substantial loss of retardant when the boards were subjected to the necessary finishing sanding.

The present method has the following advantages:
1. Minimizes loss of fire retardant chemicals during final sanding while the normal appearance of the particle-board is unchanged.
2. Retardant chemicals are deposited only where needed, which is at the surface of the finished board.
3. Mixing of the chemicals and furnish not required, and in fact this is kept to a minimum since such mixing serves to promote adherence of chemical to finer furnish particles which are eventually removed in the sanding operation.
4. The effectiveness of the fire-proofing is controlled merely by the particle size distribution of the fire retardant, and the quantity of the latter used.

These advantages are attained by incorporating into the particleboard during the manufacture thereof of particles of a suitable dry fire retardant chemical in courses or layers immediately inside and merging with outer courses or layers of the board. The felted mat from which the particleboard is made is consolidated under heat and pressure in accordance with standard practice and then the surfaces of the pressed board are sanded to produce the desired surface texture and the desired board thickness. This sanding removes the furnish particles of the outer courses of the board and exposes the two inner courses which contain the fire retardant. Thus, little or no fire retardant chemical is lost in the sanding operation, and there is no fire retardant in the core of the board. The principle of air separation is utilized to graduate the furnish and chemical particles forming the board and to deposit the retardant in the desired areas of the board. This makes it unnecessary to mix the fire retardant chemicals and the particleboard furnish prior to the time they are simultaneously deposited in said board inner courses.

The method of producing fire retardant particleboard with a minimum of fire retardant material in accordance with this invention comprises forming a mat of blended particleboard furnish having outer courses of fine particles merging into inner courses immediately inside both outer courses of furnish particles and dry retardant chemical particles, subjecting the material to heat and pressure to consolidate all of said particles into a board, and sanding off particles of the outer courses to expose the particles of said inner courses at faces of the board.

According to the present process, a sanded particleboard is made more flameproof by the addition to the usual blended furnish, prior to mat formation, of one or more dry fire retardant chemicals. The mat for the board is formed by a felter of the prior art in which air is used to blow the furnish in opposite directions longitudinally of a caul moving under the felter. The position which the majority of the retardant chemical occupies within the board is governed by the size and density of the chemical particles, together with the air speed and the position of various baffles within the mat former. A judicious choice of particle size and/or density of the chemical for any given felting system enables the chemical to be placed in position within the particleboard such that very little of the chemical is lost when the board is sanded to the desired thickness.

Any suitable fire retardant chemical in particle form can be used which is compatible with the thermosetting resin in the furnish. The retardant chemical is compatible if it does not interfere with the curing of the board, and it remains stable at the elevated temperatures used in the press cycle.

The following are examples of suitable chemicals that can be used.

Figure 2:
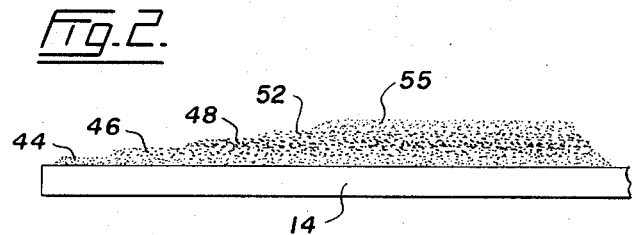
Figure 3:
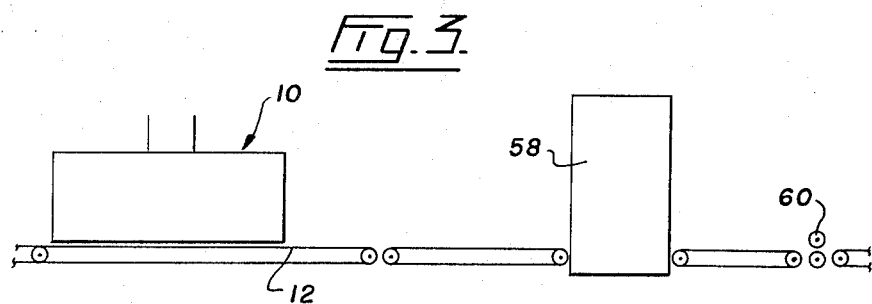

Polybor — (trade mark) a special sodium borate product having the approximate composition — $Na_2B_8O_{13} \cdot 4H_2O$ Sodium borate — $Na_2B_4O_7 \cdot 10 H_2O$ Ammonium phosphate (monobasic) $NH_4H_2PO_4$ Ammonium phosphate (dibasic) $(NH_4)_2HPO_4$ The method of this invention will be clearly understood from the following description relative to the drawings in which:

FIG. 1 is a diagrammatic sectional side elevation of a known felting machine used in this method, FIG. 2 is an enlarged diagrammatic sectional elevation of a particleboard being formed, and FIG. 3 is a diagrammatic layout of the apparatus through to the sander.

A felting machine 10 is positioned above a conveyor belt 12 which moves caul plates 14 in succession under the machine in the direction of arrow 15.

Blended particleboard furnish 18, that is, standard furnish blended with the usual thermosetting resin, such as acid catalyzed ureaformaldehyde resin, is directed from a hopper 19 on to horizontal conveyors 21 and 22 which are running in opposite directions away from each other. A dry fire retardant chemical 25 in particle form is directed by hoppers 27 and 28 on top of the layers of furnish moving upon conveyors 21 and 22. The furnish and chemical particles are allowed to drop down into streams of air moving substantially horizontally from high volume, low pressure air systems 31 and 32 which include respective baffles 34 and 35. The horizontally-moving flows of air stratify the particles in accordance with the size and density thereof. The fine particles are blown the farthest, while the coarser particles are blown lesser distances in accordance with their sizes and densities. If desired, unsegregated particles may be provided between the two air systems, in which case furnish from hopper 19 is directed into a central hopper 38 whence it is deposited on to a conveyor 39 and then allowed to drop downwardly in the machine.

The finest particles in this system are mainly furnish particles, while the coarser particles are a mixture of furnish and retardant particles. During operation of felting machine 10, fine particles at 42 are deposited on caul plate 14 to form a lower outer course 44 on the caul, see FIGS. 1 and 2. The air mixes the furnish and chemical particles and these are deposited in the area 45 to form an inner course on course 46. If furnish is supplied to hopper 38, a core course 48 is formed on inner course 46.

The effect of air system 32 on the furnish and chemical particles is opposite that deflected by air system 31, that is, the coarser furnish and chemical particles in area 50 are deposited on core course 48 to form an inner course 52, while the fine furnish particles at 54 are deposited on this inner layer as an outer course 55.

The air classification system of apparatus 10 not only locates the furnish particles in the formed mat according to the size and density of these particles so that the fine particles are near the surface areas and the coarser particles in the interior of the mat, but the fire retardant particles are located within the mat where desired, that is, spaced inwardly a little from the upper and lower surfaces of the mat.

Caul plate 14 with the formed mat thereon is directed into a suitable press 58, see FIG. 3, where the mat is subjected to heat and pressure to consolidate the particles thereof into a particleboard in accordance with standard practice. From here the compressed mat is moved through a standard sander 60 where the upper and lower surfaces of the mat are removed to produce a board of the desired thickness. This sanding operation removes part or all of the outer courses 44 and 55 of the mat so that the chemical-containing courses 46 and 52 are exposed and now constitute the surfaces of the finished particleboard.

During the manufacture of the particleboard in accordance with this process, there is very little or no loss of fire retardant chemicals in the final sanding operation, and there is no fire retardant in the core layer or course. The fire retardant chemical is well blended with the particleboard furnish without the necessity of mixing the furnish particles and chemical particles prior to the last minute deposit of these particles into their proper places in the particleboard mat being formed.

The following examples illustrate the advantages of this process:

EXAMPLE I

Wood particles (furnish) were refined to give the desired particle size range and were then dried to a moisture content of between 4 and 8 percent. A typical particle size distribution is given in Table I. After blending with a thermosetting urea-formaldehyde resin, various percentages of boron containing compounds were added to the divided portions of the furnish being delivered to the opposite ends of the felting machine. The initial thickness of the boards after pressing was 0.687 inch and this was reduced to 0.625 inch when 0.031 inch was removed from each surface by sanding.

TABLE I

A Typical Particle Size Range for Refined, Dried Furnish

| Screen No. (Tyler) | Screen Opening (inch) | Furnish Distribution (% by Weight) |
|---|---|---|
| +4 | 0.187 | — |
| +6 | 0.131 | 2.1 |
| +8 | 0.0937 | 4.7 |
| +12 | 0.0661 | 10.0 |
| +16 | 0.0469 | 14.7 |
| +20 | 0.0331 | 13.6 |
| +30 | 0.0234 | 15.5 |
| +40 | 0.0164 | 9.6 |
| +100 | 0.0059 | 18.8 |
| −100 |  | 11.0 |

TABLE II

| Chemical | Formula | Particle Size Range (inch) | Chemical Added % of Furnish and Resin | Flame Spread Rating After Sanding |
|---|---|---|---|---|
| Polybor (trade mark) | $Na_2B_8O_{13}\cdot 4H_2O$ | <0.0029 | 1.4 | 149 |
| Borax | $Na_2B_4O_7\cdot 10H_2O$ | 0.0098–0.0029 | 2.4 | 141 |
| Borax | $Na_2B_4O_7\cdot 10H_2O$ | 0.0165–0.0059 | 2.4 | 119 |
| None | — | — | — | 170 |

The flame spread ratings shown in Table II are those obtained in an extended version of the Monsanto 2-foot tunnel test (H.L. Vandersall, The Use of a Small Flame Tunnel for Evaluating Fire Hazards, Journal of Paint Technology, Vol. 39, No. 51, 494–500 [1967] ) which had been correlated with the 25 foot tunnel, NRC Ottawa, ASTM E84-70 Standard.

EXAMPLE II

To samples of furnish which had been refined, dried and blended with a thermosetting resin, as in Example I, was added various percentages of phorphorus containing compounds.

| Chemical | Formula | Particle Size Range (inch) | Chemical Added % of Furnish and Resin | Flame Spread Rating after Sanding |
|---|---|---|---|---|
| Ammonium phosphate (monobasic) | $NH_4H_2PO_4$ | 0.0937–0.0165 | 3 | 123 |
| As above | As above | 0.0165–0.0059 | 3 | 64 |
| As above | As above | 0.0059–0.0029 | 3 | 85 |
| Ammonium phosphate (dibasic) | $(NH_4)_2HPO_4$ | 0.0937–0.0165 | 3 | 153 |
| As above | As above | 0.0065–0.0059 | 3 | 79 |
| As above | As above | 0.0059–0.0029 | 3 | 93 |
| None | — | — | — | 170 |

The flame spread ratings were determined by the same procedure outlined in Example I.

We claim:

1. The method of producing fire retardant particleboard with a minimum of fire retardant material, which comprises blowing particleboard furnish and dry fire retardant chemical particles substantially parallel to a moving caul plate in a direction opposite to the movement thereof, the density and particle size of said particles being such that the finest furnish particles travel outwardly the farthest to form a lower outer course while coarser furnish and chemical particles progressively, according to particle size and density, deposit on said outer course to form an inner course, blowing additional particleboard furnish and dry fire retardant chemical particles substantially parallel to the caul plate in the direction of movement thereof, the density and particle size of said additional particles being such that the coarser furnish and chemical particles travel outwardly progressively, according to particle size and density, to deposit on the inner course of the previously-blown particles and the finer furnish particles travel outwardly the farthest to form an upper outer course, subjecting the material to heat and pressure to consolidate all of said particles into a board, and sanding off particles of the outer courses to expose the particles of said inner courses at faces of the board.

2. The method as claimed in claim 1 including depositing a core course of relatively coarse furnish particles on said first-mentioned inner course and then blowing said additional particleboard furnish and dry fire retardant chemical on said core course.

3. The method as claimed in claim 1 in which the fire retardant chemical is a compatible boron-containing compound.

4. The method as claimed in claim 1 in which the fire retardant chemical is $Na_2B_8O_{13} \cdot 4H_2O$.

5. The method as claimed in claim 1 in which the fire retardant chemical is sodium borate.

6. The method as claimed in claim 1 in which the fire retardant chemical is ammonium phosphate (monobasic).

7. The method as claimed in claim 1 in which the fire retardant chemical is ammonium phosphate (dibasic).

* * * * *